July 10, 1923.
C. MACMILLAN
SHIP PROPULSION SYSTEM
Original Filed Sept. 19, 1921
1,461,551
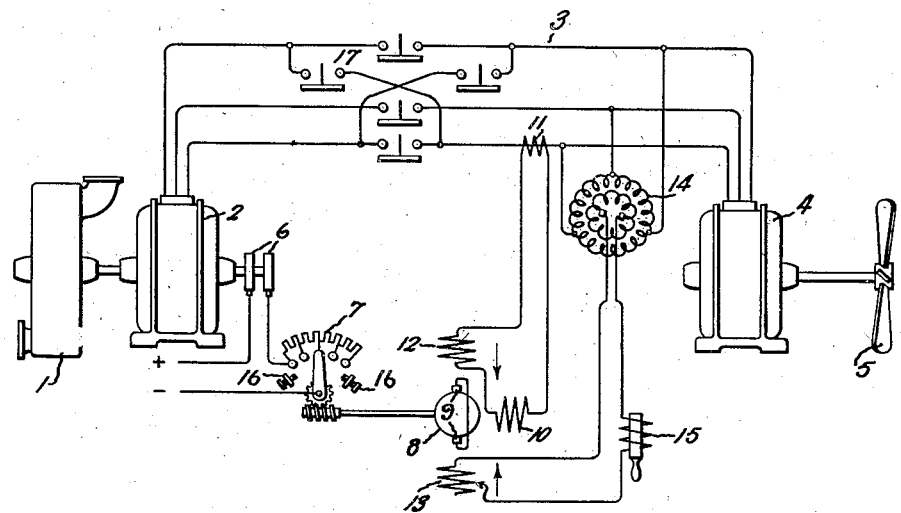
Inventor:
Campbell Macmillan,
by Albert G. Davis
His Attorney.

Patented July 10, 1923.

1,461,551

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

SHIP-PROPULSION SYSTEM.

Application filed September 19, 1921, Serial No. 501,651. Renewed May 10, 1923.

*To all whom it may concern:*

Be it known that I, CAMPBELL MACMILLAN, a citizen of the United States, residing at Schenectady, in the county of Schenectady, State of New York, have invented certain new and useful Improvements in Ship-Propulsion Systems, of which the following is a specification.

My invention relates to electric power systems wherein a work motor of either the induction or synchronous type is supplied from a synchronous alternating current generator driven by an adjustable speed prime mover and wherein the excitation of the system is controlled so as to enable the system to operate in the most efficient manner and prevent the motor from falling out of step on heavy loads.

An object of my invention is to provide improved means responsive to the stability conditions of such a system which means is adapted directly to exert the torque necessary for operating an excitation regulator whereby the use of contact making instruments is rendered unnecessary.

The accompanying drawing diagrammatically illustrates an electric ship propulsion system showing showing one embodiment of my invention.

The capacity of a ship propulsion system is at present limited by the heating of the generator field winding and it is, therefore, very desirable that the excitation of the system be maintained at the minimum value essential for stable operation of the propeller driving motor or motors. The condition for stable operation requires that an approximately constant ratio be maintained between the current and voltage of the system at any given speed of the generator. Changes in speed of the generator produce a substantially proportioned change in the impedance of the system, however, so that the general condition for stable operation requires that the ratio $$\frac{fE}{I}$$

be kept constant, where $f$ represents the frequency, $E$ the voltage, and $I$ the current of the system. When such a relation is maintained there is a good approximation to constant efficiency, power factor and permissible overload of the motors in torque percentage. The changes in load on a ship propulsion system occur at a relatively slow rate so that a pilot motor operation of the excitation regulating means is perfectly practicable.

My invention will be better understood from the following description taken in connection with the accompanying drawing and its scope will be pointed out in the appended claims.

Referring to the accompanying drawing, the adjustable speed prime mover 1, is indicated as an elastic fluid turbine. This turbine is arranged to drive directly the synchronous generator 2 which is connected by the mains 3 to the alternating current motor 4, the rotatable element of which is arranged to drive directly the load represented as a ship's propeller 5. Exciting current is supplied to the slip rings 6 of the generator through excitation regulating means represented as an adjustable resistance 7, arranged to be operated by the pilot motor 8. This pilot motor is represented as a commutor machine of the repulsion type provided with short circuited brushes 9. The stator winding of the motor 8 is shown in three sections with separate functions. The field winding of the motor is shown at 10 and this winding is in series relation with the main circuit between the generator 2 and motor 4 as by means of the current transformer 11. The pilot motor is provided with two transformer windings for inducing currents in the armature, one of which windings 12 is in series with the winding 10. It is obvious to those skilled in the art that the functions of windings 10 and 12 may be secured by a single winding placed in the proper angular relation to the short circuited brushes 9. The second transformer winding 13 is supplied from the potential transformer 14 adjusted to produce phase opposition between the windings 12 and 13. A reactance 15 is provided in the circuit of winding 13 to render the winding 13 independent of changes in voltage of the main line due to changes in frequency of the generator 2. Stops 16 are provided on the excitation regulator to limit the movement of the armature of the pilot motor. Reversing switches 17 are provided in the main line between the generator 2 and the motor 4 to control the direction of the rotation of the motor in a manner well known in the art.

While I have represented the excitation regulating means as comprising a rheostat in the main exciting circuit it will be obvious to those skilled in the art that any equivalent means operated in substantially the same manner from the pilot motor may be substituted. It will also be obvious to those skilled in the art that my invention in its broader aspects is not limited to a pilot motor of the repulsion type but I preferably use a repulsion motor for the reason that such a motor presents certain advantages from the standpoint of sparkless operation where, as in this case, the motor never passes beyond a starting condition. That is to say, the motor never runs continuously in one direction or the other but merely rotates through the small extent necessary to give the necessary regulation.

It will be observed that the armature of the pilot motor is freely rotatable in the sense that it does not operate against an opposing spring or equivalent counter-torque device.

If it be assumed that the system is in normal operation and an increase of load occurs on the propeller driving motor due, for example, to a head wind or a movement of the helm, an increased current will be taken by the motor and the voltage of the system will fall. The winding 12 will, therefore, be strengthened and the winding 13 weakened and the pilot motor will operate the regulating rheostat to increase the excitation of the generator to enable the motor to carry the additional load without falling out of step. Similarly if the load on the propeller decreases, the excitation will be reduced, the pilot motor in each case coming to rest when the excitation has been changed to the amount necessary to cause windings 12 and 13 to neutralize each other. The field winding 10 of the pilot motor being in series relation with the work motor will always be strongly energized and insure the development of the necessary torque in the pilot motor to operate the regulator whenever there is a slight difference in the inducing effect of the windings 12 and 13. If at any time the speed of the generator is reduced the voltage and frequency of the current delivered to the motor will fall proportionally but the current to the motor will not be changed, unless the load on the motor is also changed, since the impedance of the motor circuit falls substantially in proportion to the reduction in frequency by reason of the fact that the reactance of the circuit is large compared with its resistance. The maximum output of the alternator for the excitation existing still occurs at the same value of line current and the operation will be stable at the reduced speed without adjustment of the excitation. In order to insure that the pilot motor remains at rest for changes in voltage due to changes in frequency I provide the reactance 15 in circuit with the voltage responsive winding 13 and by making this reactance of relatively large value the current through the winding 13 remains unchanged with changes in speed of the generator. As a matter of fact in a ship propulsion system a reduction in speed of the generator and propeller driving motor will greatly reduce the load on the propeller driving motor, and therefore, the current taken by the motor will decrease and the winding 13 will, therefore preponderate over the winding 12 until the excitation is reduced to the amount sufficient for stable operation at the reduced speed. Since the armature of the pilot motor is freely rotatable and does not have any fixed initial position, I provide the stop 16 to keep the regulating arm within the range of its operation. If it is desired to readjust the ratio of the windings of the torque motor as, for example, where it is desired to adjust the device for a higher degree of excitation this may be done by varying the number of turns in the coil 13 or by adjusting the reactance 15 provided the reactance is at all times kept sufficiently high to render the current in the winding 13 independent of changes in voltage due to changes in speed of the generator.

The exciter for a system of the character shown will preferably be designed to furnish very large overloads for maneuvering operations such as accelerating and reversing the ship. The system will automatically provide maximum excitation during such maneuvering operations and the regulator will act to remove the overload from the exciter at the earliest possible moment. Over excitation during maneuvering operations is advantageous since it increases the torque obtainable from the motor or motors of the system.

While I have described my invention particularly in connection with regulation of the excitation of the generator it will be obvious to those skilled in the art that where synchronous motors are used the regulating means will preferably operate simultaneously on the fields of both generator and motor.

What I claim as new and desire to secure by Letters Patent of the United States, is:—

1. In an electric power system of the class described, an adjustable speed generating machine of the synchronous type, a load driving dynamo electric machine supplied thereby, means for controlling the excitation strength of one of said machines, a commutator type dynamo electric machine having a freely rotatable element connected to operate said excitation controlling means, said commutator machine comprising a winding connected in series relation with said generator and an opposing winding connected to respond to the voltage of said generator and means in the circuit of said voltage winding to render the current therein substantially independent of changes in generator voltage due to changes in speed.

2. In an electric power system of the class described, an adjustable speed synchronous generator, an alternating current load driving motor, means for regulating the excitation of said generator, a repulsion motor provided with a freely rotatable element connected to operate said regulating means, means for producing a field flux in said repulsion motor proportionad to the current supplied from said generator to said load driving motor, means for inducing working current in said repulsion motor in accordance with the ratio of generator current to generator voltage at any given generator speed.

3. In an electric power system of the class described, an adjustable speed synchronous generator, an alternating current load driving motor, a rheostat for varying the generator excitation, a repulsion motor for operating said rheostat, means for producing a field flux in said repulsion motor proportional to the current supplied to said load driving motor, an inducing winding for said repulsion motor connected in series relation between said generator and motor, a second inducing winding for said repulsion motor connected in shunt relation to said generator and arranged to oppose said series inducing winding, and a reactance in circuit with said second inducing winding to render the current therein independent of changes in voltage of said generator due to changes in speed.

In witness whereof, I have hereunto set my hand this 17th day of September, 1921.

CAMPBELL MACMILLAN.